E. R. RYDER.
LIQUID METER.
APPLICATION FILED AUG. 24, 1917.

1,281,665.

Patented Oct. 15, 1918.

WITNESSES:
Robert S. Bassett
Chas. K. Bassett

INVENTOR
Earl R. Ryder

UNITED STATES PATENT OFFICE.

EARL R. RYDER, OF BUFFALO, NEW YORK, ASSIGNOR TO GEORGE B. BASSETT, OF BUFFALO, NEW YORK.

LIQUID-METER.

1,281,665.      Specification of Letters Patent.      Patented Oct. 15, 1918.

Application filed August 24, 1917. Serial No. 188,051.

*To all whom it may concern:*

Be it known that I, EARL R. RYDER, a citizen of the United States, residing at Buffalo, in the county of Erie and State of New York, have invented a new and useful Liquid-Meter, of which the following is a specification, reference being had to the drawings accompanying and forming a part thereof.

My invention relates to improvements in liquid meters in which an indicator is driven by a liquid operated mechanism and more particularly to such as are known as semi-positive meters in which the working joints of the liquid operated mechanism are kept semi-tight by a film of liquid retarded in its passage through said working joint by capillary attraction, or what is commonly called water packing.

The objects of my present invention are principally to provide means for adjusting such meters for accuracy by providing a small compenating by-pass around the liquid operated mechanism of the meter and means of regulating the size of the opening in this by-pass and when regulated of sealing same.

I will now proceed to definitely describe the manner in which I have carried out my invention and then claim what I believe to be novel.

Figure 1:
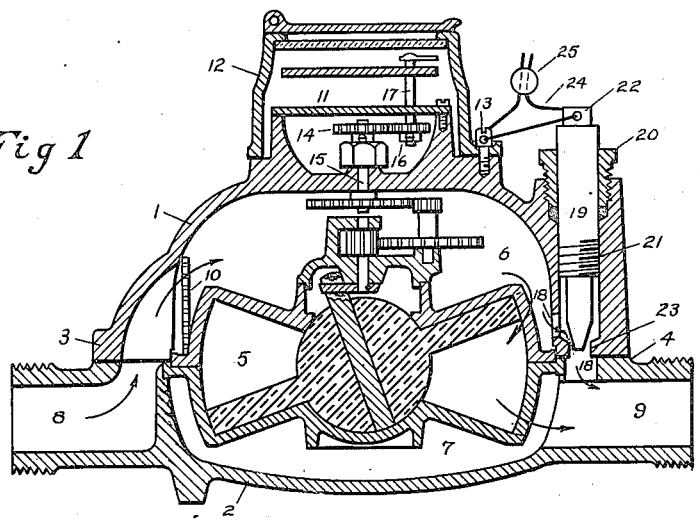
Figure 2:
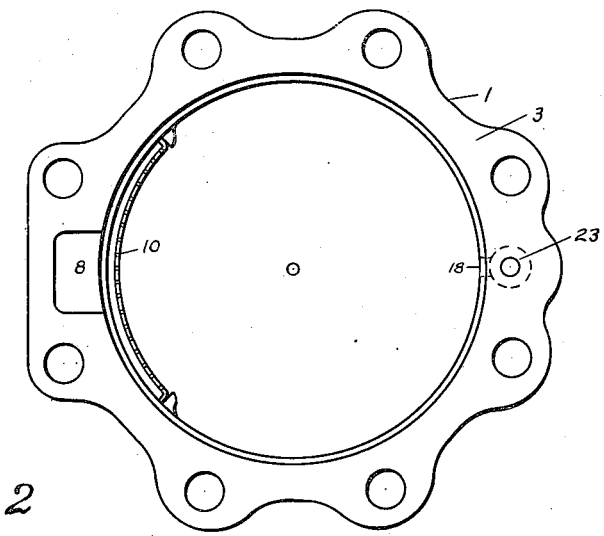

In the drawings, Figure 1 is a central vertical longitudinal section of my improved meter showing the interior working parts in place. Fig. 2 is a horizontal upward view of the upper section of the outside casing of the meter.

The outer casing of the meter is composed of two detachable parts, 1 and 2, which may be fastened together by bolts passing through the meeting flanges, 3 and 4. Between meeting flanges 3 and 4 is supported the liquid operated mechanism 5, which in this drawing is shown as of the well-known nutating disk piston type, and which divides the interior of the meter case into inlet chamber 6 and outlet chamber 7. The passage through inlet spud 8 communicates with inlet chamber 6 and the passage through outlet spud 9 communicates with outlet chamber 7. Strainer 10 is located in the upper outside casing 1.

Indicator 11 is located on top of outer casing 1 and is covered by indicator cap 12, which is fastened to the top of outer casing 1 by sealing screw 13. Meter change gear 14 is fastened to the upper end of stuffing box shaft 15, which is rotated by liquid operated mechanism 5.

Indicator change gear 16 is fastened to indicator shaft 17 and meshes with and is operated by meter change gear 14.

Compensating by-pass 18 extends from inlet chamber 6 to the passage in outlet spud 9. Located in by-pass 18 is the adjustable needle valve 19, the upper end of which passes through stuffing box gland 20 and is provided with adjusting screw threads 21 and sealing hole 22. In by-pass 18 is located valve seat 23 adapted to coöperate with needle valve 19.

Passing through sealing hole 22 in needle valve 19 is sealing wire 24 sealed with lead seal 25.

In the general application of my invention, the meter is put on the testing bench and liquid forced through it and then measured and the indicator adjusted to register closely to the measured quantity of liquid by using change gears 14 and 16 with a suitable number of teeth on each. This change gear adjustment however from its very nature is in steps and there are points in the adjustment between using change gears with one more tooth or one less tooth which cannot be made by the change gears, but which are readily allowed for and the meter accurately adjusted by raising or lowering adjustable needle valve 19 and thereby increasing or decreasing gradually the amount of water passing through compensating by-pass 18. When properly adjusted needle valve 19 is sealed in position by sealing wire 24 and lead seal 25 or otherwise.

In the application of my invention to semi-positive meters, it is possible to readily compensate for an increase or decrease in the seepage of the liquid being measured through the working water packed joints of the meter due to a change in the viscosity of the liquid or its temperature or both or due to an increase or decrease in the size or width of the working water packed joints of the meter caused by wear or other relative changes in the size of the parts of the meter.

Having thus described my invention, what I claim and desire to secure by Letters Patent is—

A liquid meter comprising a semi-positive liquid operated device, a registering indicator operated by said device, a bottom casing with inlet and outlet spuds, a separable top casing with a compensating by-pass adapted to pass a portion of the liquid to be measured around said device, and means to regulate the flow through said by-pass; substantially as and for the purpose described.

EARL R. RYDER.

Witnesses:
ARLENE R. KOHNEN,
W. J. CHELLEW.